United States Patent [19]
Barbier et al.

[11] Patent Number: 4,726,182
[45] Date of Patent: Feb. 23, 1988

[54] VARIABLE FLOW AIR-FUEL MIXING DEVICE FOR A TURBOJET ENGINE

[75] Inventors: Gerard Y. G. Barbier, Morangis; Gerard J. P. Bayle-Laboure, Avon; Pierre A. P. Bouillot, Yerres; Michel A. A. Desaulty, Vert-Saint-Denis; Rodolphe Martinez, Perigny S/Yerre, all of France

[73] Assignee: 501 Societe Nationale D'Etude et de Construction de Meteur d'Aviation-S.N.E.C.M.A., Paris, France

[21] Appl. No.: 792,685

[22] Filed: Oct. 29, 1985

[30] Foreign Application Priority Data

Oct. 30, 1984 [FR] France ................. 84 16536

[51] Int. Cl.⁴ .................. F02C 9/00; F02C 1/00
[52] U.S. Cl. ...................... 60/39.23; 60/737; 60/748
[58] Field of Search ............ 60/39.23, 39.27, 740, 60/742, 748, 734, 737, 39.29

[56] References Cited

U.S. PATENT DOCUMENTS

| | | | |
|---|---|---|---|
| 2,446,059 | 7/1948 | Peterson et al. | 60/39.23 |
| 3,490,230 | 1/1970 | Pillsbury et al. | |
| 3,958,413 | 5/1976 | Cornelius et al. | 60/39.23 |
| 4,085,579 | 4/1978 | Holzapfel et al. | 60/39.29 |
| 4,162,611 | 7/1979 | Caruel et al. | |
| 4,263,780 | 4/1981 | Stettler | 60/748 |
| 4,385,490 | 5/1983 | Schirmer et al. | |
| 4,563,875 | 1/1986 | Howard | 60/737 |

FOREIGN PATENT DOCUMENTS

| | | |
|---|---|---|
| 2511172 | 3/1975 | Fed. Rep. of Germany . |
| 2206796 | 11/1972 | France . |
| 2270448 | 5/1974 | France . |
| 644719 | 10/1950 | United Kingdom . |
| 672530 | 5/1952 | United Kingdom . |
| 2085147 | 4/1982 | United Kingdom . |

*Primary Examiner*—Louis J. Casaregola
*Attorney, Agent, or Firm*—Bacon & Thomas

[57] ABSTRACT

A system is disclosed for controlling the flow of air through the air-fuel mixing device for a turbojet engine. The system simultaneously controls the amount of air passing through turbulence generating baffles and that passing into the combustion chamber depending upon the operating conditions of the turbojet engine.

8 Claims, 13 Drawing Figures

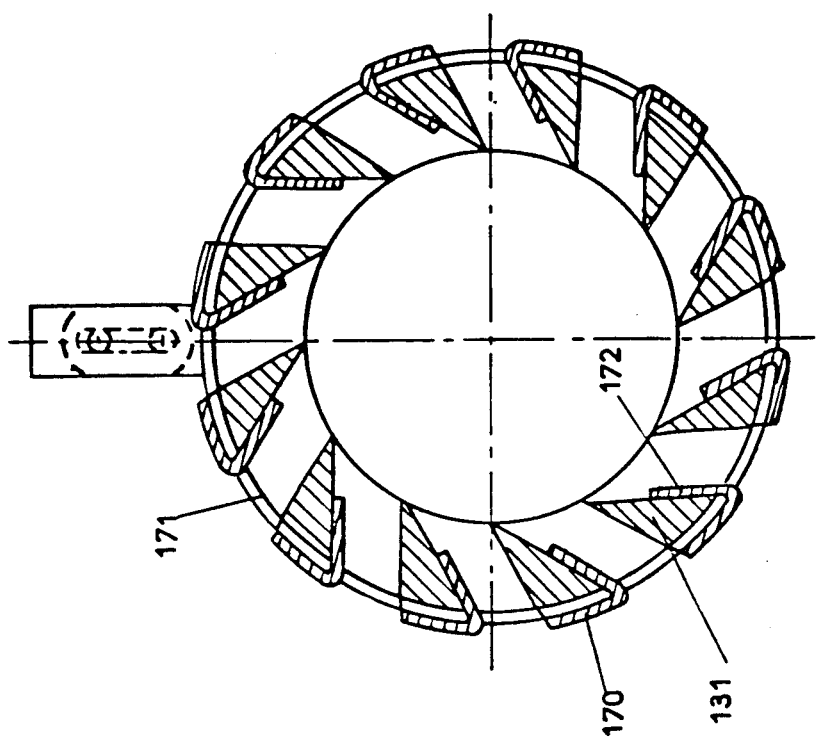
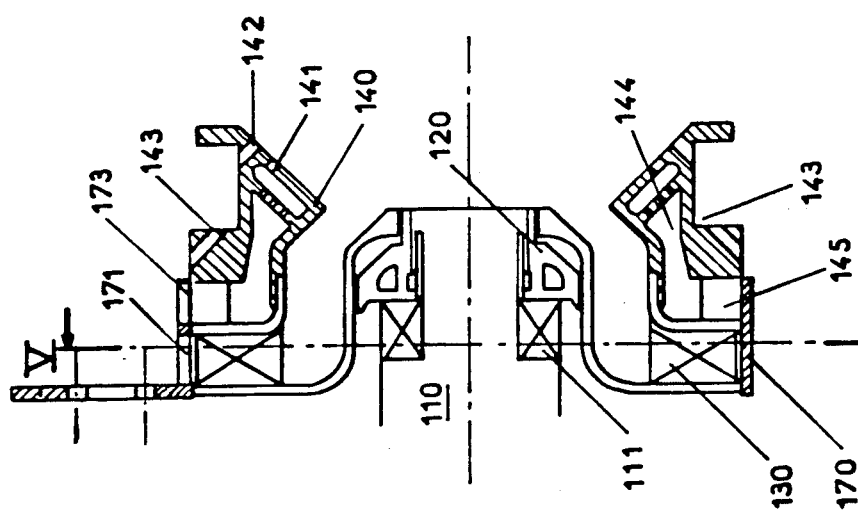
FIG. 5
FIG. 4

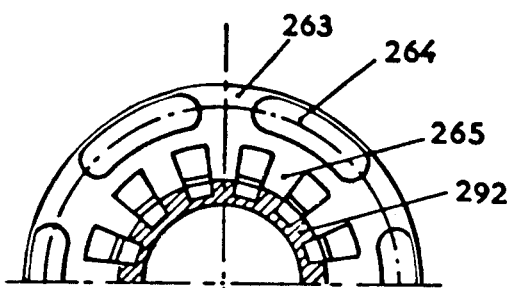
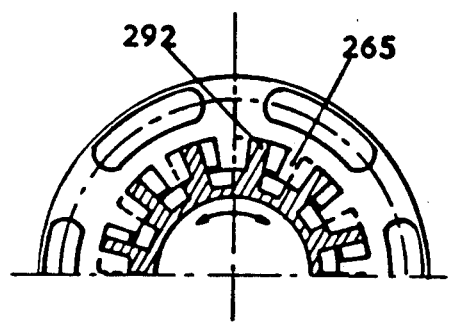
FIG. 7
FIG. 11
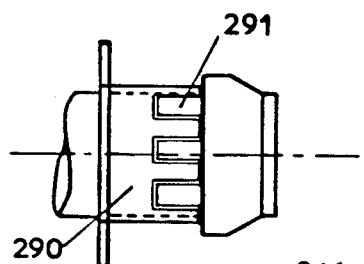
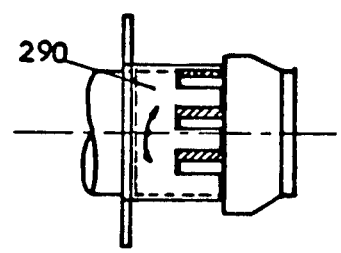
FIG. 8
FIG. 12
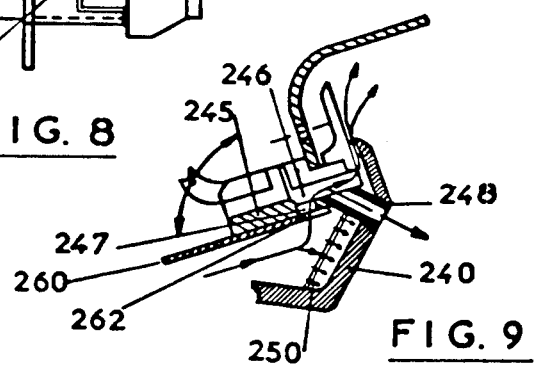
FIG. 9
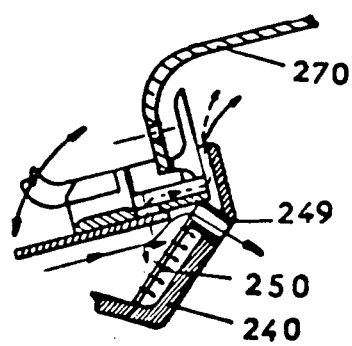
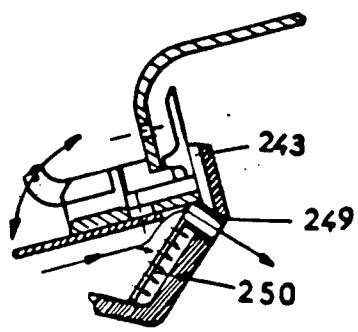
FIG. 10
FIG. 13

VARIABLE FLOW AIR-FUEL MIXING DEVICE FOR A TURBOJET ENGINE

FIELD OF THE INVENTION

The present invention relates to an air-fuel mixing device for a turbojet engine, specifically such a device having means to vary the air flow depending upon operating conditions of the engine.

BRIEF DESCRIPTION OF THE PRIOR ART

The combustion chambers of conventional turbojet engines typically operate at sub-stoichiometric fuel ratios. To obtain efficiency and stability over a wide range of operational parameters, the chambers are typically divided into two zones: a primary zone fed by a portion of the incoming air flow which is maintained fuel-rich; and a dilution zone into which the remaining air flow is injected. The dilution zone reduces the average temperature of the hot gases issuing from the primary zone and adjusts the outlet temperature so as to maximize turbine service life.

The selection of the portion of the air flow to be injected into the primary zone is determined by a compromise between the desired performance of the chamber at high engine speeds to minimize smoke emission and internal temperatures, and the performance of the chamber at low engine speeds, namely, maximum efficiency and stability of operation. Due to the ever increasing operational range of the modern turbojet engine, this compromise has become increasingly unacceptable in regards to the increasing pollution standards and the desire for maximum fuel efficiency.

A first solution to this comprise problem was achieved by adopting two-module chambers having one design for low speed operation and the other designed for high speed operation. These chambers were developed mainly to decrease the pollution emissions from the engines and have proven to be relatively heavy and cost-inefficient. These chambers require a large number of fuel injection points and may cause control problems at intermediate speeds.

Another solution has been to continuously distribute the air flow as a function of the operational speeds by means of mobile flaps which act as diaphragms on the combustion chamber air intakes. This solution has allowed continuous optimization of the combustion chamber operation, and results in a substantial reduction in the combustion chamber volume and, hence, in weight and bulk of the engine.

British patent No. 663,639 discloses a burner constituting a source of hot air in an air-gas heat exchanger which provides high-temperature air to an industrial turbine or a cracking plant. This patent discloses the use of an axially sliding flap which, in combination with a manual control, controls all of the chamber's air intakes. This apparatus, besides being applied in a field totally different from a turbojet engine, does not utilize automatic modulation of the air-fuel mixture as a function of the operational conditions, since, in one of the positions of the axial flap, the air intake is totally closed. This, of course, would result in the complete extinction of combustion if applied to a turbojet engine.

SUMMARY OF THE INVENTION

It is the purpose of this invention to provide an air-fuel injection system which provides a variable intake geometry to the combustion chamber so as to maximize the fuel combustion throughout the operational range of the engine. The system described herein is specifically adapted to turbojet engines having aerodynamic bowl-shaped injectors of the type described in applicant's prior patent (French patent No. 2,357,738) and its certificate of addition (No. 2,391,359).

Such injectors typically include one or more sets of turbulence generating baffles through which the incoming air from the compressor passes over prior to atomizing the fuel to achieve an air-fuel pre-mixture. Such injectors are mounted at the upstream end of the combustion chamber with the bowl-shaped member interposed between the combustion chamber and the fuel injection port. The bowl has a frustoconical portion at its downstream end which defines a plurality of small diameter holes which admit high pressure air to the atomized fuel cone. The air turbulence generated by the baffles causes a thorough mixture of the air and fuel and assures a more complete burning of the mixture. It also acts on the mixture composition and creates a primary mini-zone at low speeds.

The air flow passing through this injection system (the spin baffles and the bowl) was chosen to be approximately 10% of the total air flow. As explained above, this is a compromise value between the air flows required for satisfactory performance at wide open throttle and at low speeds, approximately 20% and 5-8%, respectively.

The system according to the invention allows varying the air flow from 5% to 20% of the total incoming air flow according to the operational conditions of the engine which constantly optimizes the operation of the combustion chambers.

The injection system comprises a fuel injector, at least one set of spin baffles for transmitting the atomization air and a bowl member having a first row of orifices to inject air into the atomized fuel cone. It also includes moveable means for simultaneously controlling the air flows through the spin baffles and the orifices.

In an alternative embodiment of the invention, the control means also acts on the bowl cooling air. The thermal resistance of the injection system and, the bowl member in particular, is highly sensitive to geometric and aerodynamic parameters, such as bowl angle, the ratio of air flows through the baffles, etc. In the case of a variable geometry system, the aerodynamic parameters do not stay constant, but change such that the cooling obtained by fuel passing along the walls and by directing air below the bowl collar, are insufficient for wide open throttle conditions. The system according to the invention allows modulating the flow of cooling air as a function of the operational conditions.

The bowl orifices may also be fed in part with air having previously circulated by impact or convection in a cooling chamber. The control means acts on the intake cross-section of this chamber.

BRIEF DESCRIPTION OF THE DRAWINGS

FIG. 4 is a sectional view of the variable flow air-fuel mixing device according to a second embodiment of the invention.

FIG. 5 is a view taken along line V—V in FIG. 4 showing wide open throttle conditions.

FIG. 7 is a view taken along line VII—VII in FIG. 6 showing the device in the wide open throttle mode.

FIG. 8 is a partial view showing a portion of the baffle intake of the device in FIG. 6 in the wide open throttle mode.

FIG. 9 is a partial, longitudinal sectional view of the device of FIG. 6 in the wide open throttle mode.

FIG. 10 is a partial, longitudinal sectional view of the device of FIG. 6 in the wide open throttle mode.

FIG. 11 is a partial view taken along line VII—VII in FIG. 6 showing the device in the low speed operational mode.

FIG. 12 is a partial view showing the baffle intake of FIG. 8 in the low speed operational mode.

FIG. 13 is a partial, longitudinal sectional view of the device shown in FIG. 6 in the low speed operational mode.

DETAILED DESCRIPTION OF THE PREFERRED EMBODIMENTS

Figure 1:
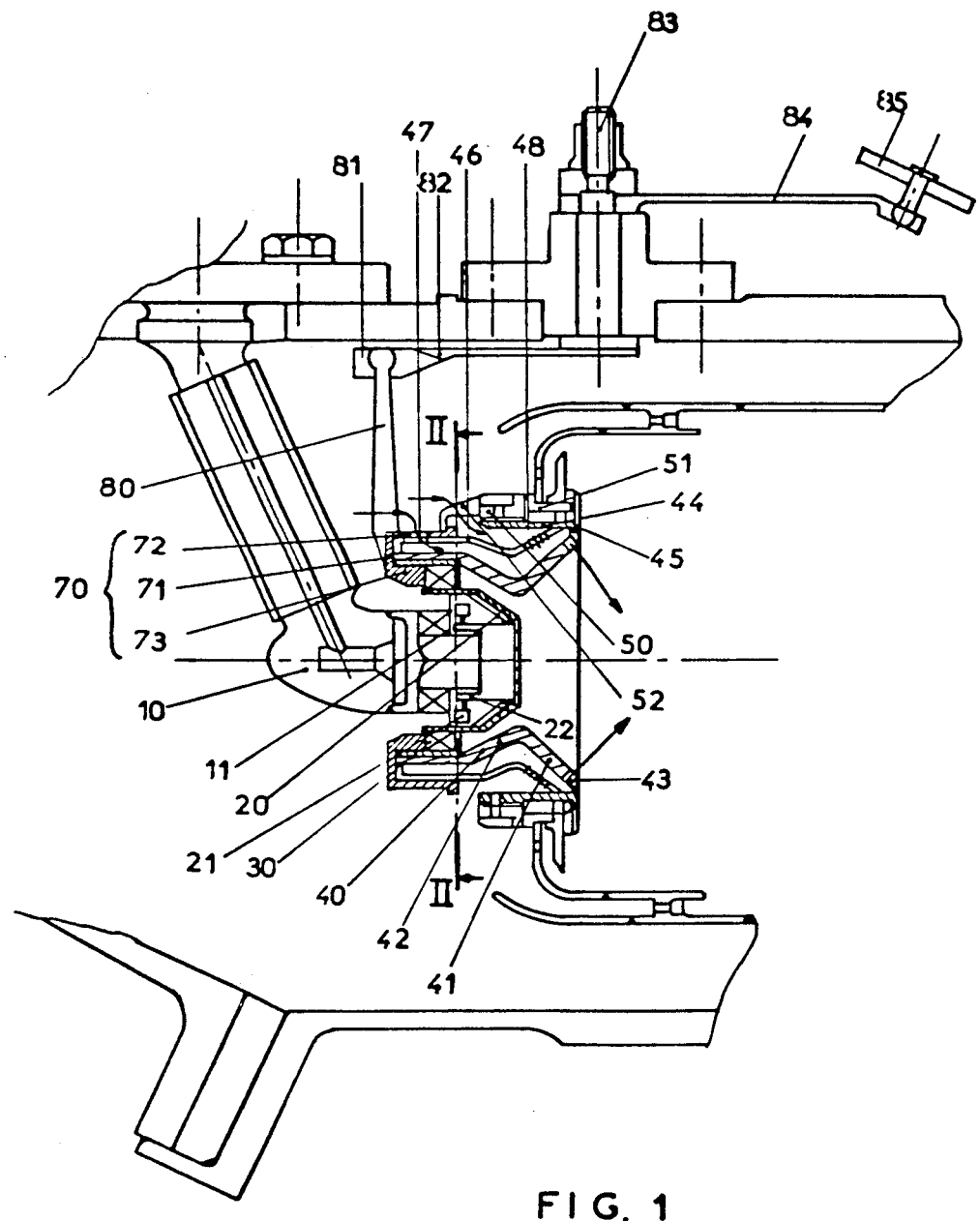
FIG. 1 is a partial, longitudinal sectional view of the variable flow air-fuel mixing device according to a first embodiment of the invention.

FIG. 1 shows the upstream end portion of a turbojet engine combustion chamber which includes the injection system according to a first embodiment of the invention. A portion of the incoming air from the compressor is directed through the injection system to form a vaporized air-fuel mixture. This mixture passes into the primary zone where the combustion reactions take place. Next, the gases are diluted and cooled in the secondary downstream zone before passing toward the turbine. The injection system includes an atomizing aerodynamic fuel injector described in French patent No. 2,206,796.

The system includes a fuel-intake, contoured central body 10 having internal, centrifugal spin baffles 11 to generate air turbulence. Annular cap 20 defines internal annular channel 21 into which fuel passes through channels formed inside the baffles 11. The fuel issues through an annular slit 22 into the cap's tubular channel joining the set of spin baffles. A row of external baffles 30 having essentially an axial flow is mounted on cap 20. The fuel issuing from slit 22 is atomized by the shear effect between the turbulent air flow generated by the spin baffles 11 and the spin baffles 30.

The injector is connected to the combustion chamber by bowl-shaped member 40 having a downstream, frustoconical section 41 and a generally cylindrical portion concentric with the set of baffles 30. Frustoconical portion 42 interconnects portions 40 and 41 and, in conjunction with cap 20 forms an annular channel for the turbulent air passing through the set of baffles 30.

The downstream end of bowl 40 defines a plurality of orifices 43 which are distributed about its periphery and are oriented toward the longitudinal axis of the combustion chamber. The bowl 40 is connected to the chamber by a cylindrical collar 44 which is offset at its downstream edge and which includes radial flange 45. Nut 50 is threaded onto the cylindrical collar to clamp the bowl member 40 to the combustion chamber by a ring 51 which is rigidly attached to the chamber structure. The ring 51 is gripped between the nut 50 and the flange to secure it in position.

Sleeve member 46 is concentrically mounted about bowl member 40 so as to define a passage therebetween. Sleeve 46 has a plurality of air openings 47 located near its upstream end which are distributed about its periphery. The downstream portion of sleeve 46 adjacent to bowl portion 41 has a plurality of perforations 48 of small diameter to form air jets directed on to the bowl portion 41 so as to cool this portion by impact.

The air flow control device 70 comprises a ring member 71 rotatably attached to sleeve member 46 having a generally "L" cross-section. The longer leg of the "L" rotates about sleeve member 46 and defines a plurality of air openings 72 which correspond to air openings 47. A plurality of fins 73 are attached to the ring member 71 and extend upstream of the baffles 30. Fins 73 correspond both in numbers and cross-section to the baffles 30. Stud 52 extends from nut 50 and cooperates with the ring 71 to prevent its axial displacement.

The rotation of ring 71 is achieved by lever 80, attached to ring 71 which engages a fork 81 formed on lever 82. Lever 82 is rigidly attached to rotatable shaft 83 which extends through the engine structure. The outer end of shaft 83 is connected to link 84, which, in turn, is connected to synchronizing ring 85. Synchronizing ring 85 may be connected to other such devices so as to control all of the combustion chambers associated with the engine.

The operation of the device is effected by rotating synchronizing ring 85 by known actuating means (not shown) which rotates ring member 71 through the previously described linkage mechanism. The rotation of ring 71 causes the openings 72 to be displaced from alignment with openings 47 thereby restricting the air flow into the passage between the bowl member 40 and sleeve member 46. At the same time, fins 73 are displaced into the area between individual baffles 30, thereby restricting the passage of air flow through the baffle structure.

Figure 2:
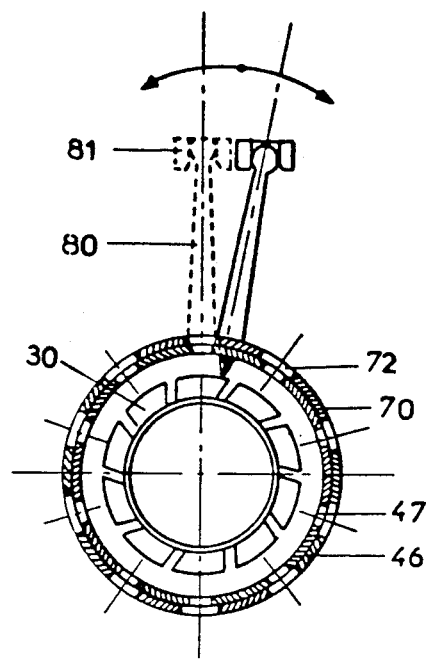
FIG. 2 is a sectional view taken along line II—II of FIG. 1 showing the system under wide open throttle conditions.
Figure 3:
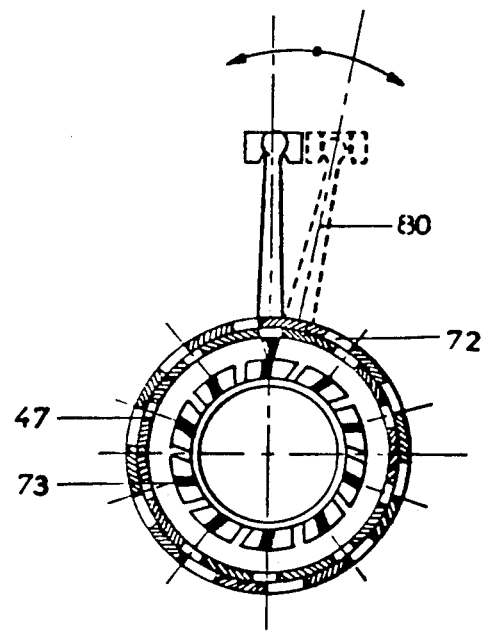
FIG. 3 is a sectional view taken along line II—II of FIG. 1 showing the system in a low-speed mode of operation.
Figure 6:
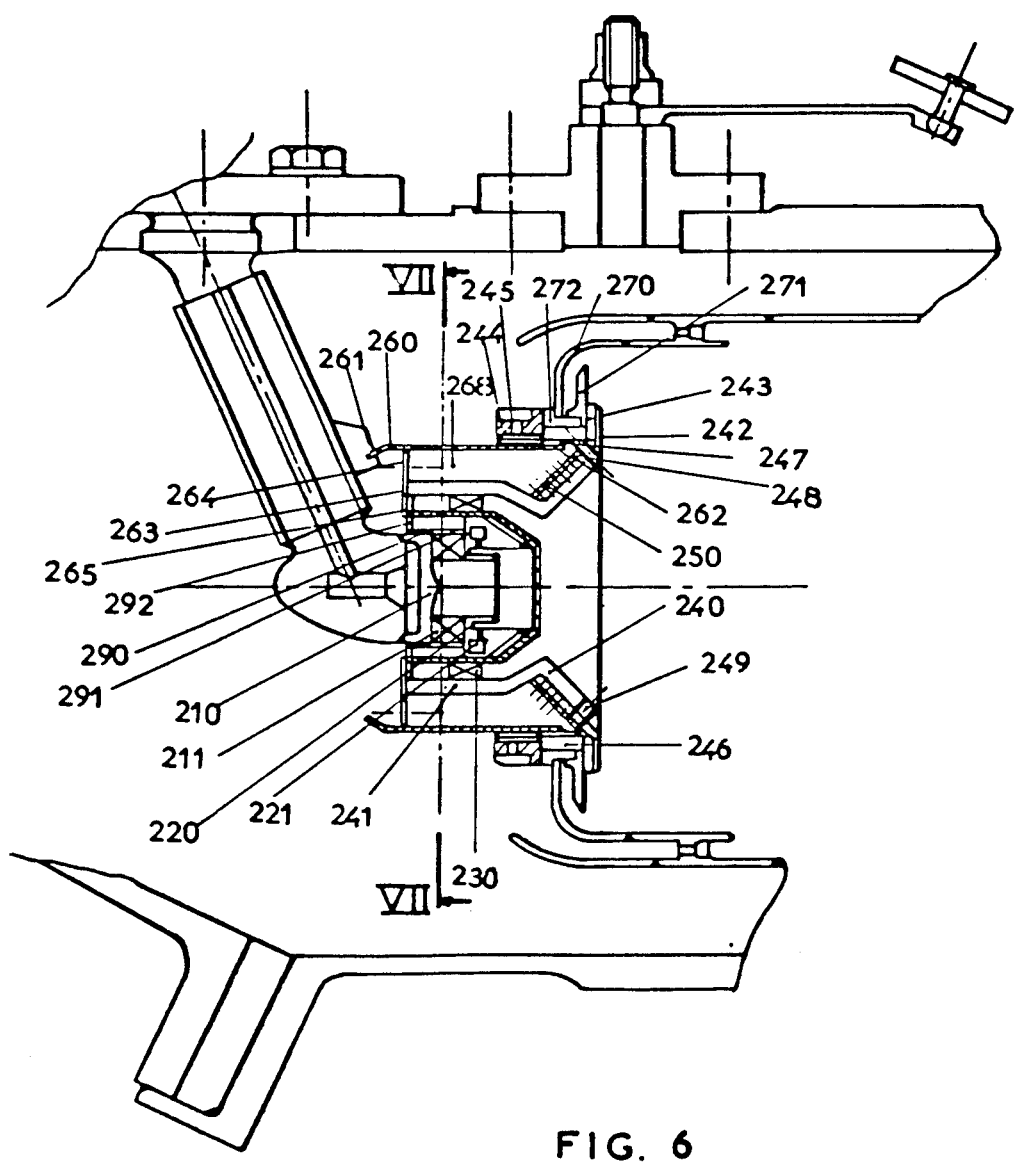
FIG. 6 is a partial, longitudinal sectional view of a third embodiment of the mixing device according to the invention.

FIGS. 2 and 3 are sectional views taken along line II—II in FIG. 1 and show the respective wide open throttle and low speed operational positions of the ring 71. The wide open throttle configuration is shown in FIG. 2 and it is seen that openings 47 are aligned with openings 72 in that the baffles 30 are fully open to provide unrestricted passage of air therethrough. In this orientation, the maximum air flow takes place through the injection system, which may be on the order of 20% of the total upstream air flow. The air circulating between sleeve member 46 and bowl member 40 effectively cools the walls of the bowl member 40 by convection before it passes through orifices 43 into the combustion chamber. The perforations 48 provide additional cooling by directing air onto the frustoconical section 41 of the bowl member 40.

FIG. 3 shows the configuration for the low speed operational mode wherein openings 72 are circumferentially displaced from openings 47 to restrict the flow of air therethrough. At the same time, the flow of air through baffles 30 is restricted due to the circumferential displacement of fins 73. Thus, in this configuration, only 5-8% of the total upstream air flow passes through the system.

A second embodiment of the invention is shown in FIGS. 4 and 5. In this embodiment, the outer set of spin baffles have a radially inwardly flow of air across them, as opposed to the substantially axial flow of the baffles in the embodiment shown in FIG. 1. The fuel injection tube 110 and the internal set of spin baffles 111 are substantially the same as shown in FIG. 1 and are illustrated only schematically in FIG. 4. A centripetal-flow outer set of baffles 130 is mounted on cap 120. The individual baffles 131 of this set are contoured so as to define air flow channels between them which have a substantially constant cross-section, as shown in FIG. 5. Bowl member 140 is attached to the set of baffles 130 and defines two sets of air injection orifices 141, 142 in its frustoconical portion. Skirt member 143 and bowl member 140 define between them an annular space 144 which communicates with the incoming air through air openings 145 located adjacent to the spin baffles 130. A perforated sheet metal member is mounted in the annular space 144 near the frustoconical portion of bowl member 140. The air flow control means comprises ring member 170 rotatably mounted about the skirt member 143 such that it axially extends over the inlet to the spin baffles 130 and the air openings 145. Ring member 170 defines a plurality of first air orifices 171 and a second plurality of air orifices 173. Orifices 171 are aligned with the baffles 130, while orifices 173 are aligned with air openings 145. As can be seen, as ring 170 is rotated, the air orifices are moved out of alignment with the spin baffles 130 and the air openings 145 to restrict the flow of air therethrough. The ring may be actuated by a mechanism similar to that shown in FIG. 1.

FIG. 5 shows the position of the ring member 170 during wide open throttle operation in which the system is fully open. Fin members 172 are attached to ring 170 adjacent each of the first orifices and extend into the corresponding air channel between individual baffles 131. As shown in FIG. 5, when the system is fully open, fin members 172 rest against the surface of the baffles 131. The bowl member 140 is cooled by air passing through the openings 145 and passing over its wall and by impact after passing through the perforated sheet metal near the frustoconical portion. The air then passes through orifices 141 into the combustion chamber.

During low speed and stable speed operations, the spin baffles 130 and the air openings 145 are restricted due to the rotation of ring 170. The air flow is typically reduced to a value of approximately 10% of its full opening. The complete atomization and distribution of the fuel are augmented by the internal spin baffles 111 and air passing directly through orifices 142 into the combustion chamber. During this operating condition, fin members 172 serve to guide the air and accelerate it through the spin baffles 130.

In the first embodiment of the invention, the radial fins which restrict the passages between the baffle members are located in front of the baffle structure. The degree of restriction of the air flow is, therefore, dependent upon the thickness of these fins. The increase in the fin thickness increases the bulk of the system and presents the possibility of weak formation in the outlet plane which may adversely affect the thermal resistance of the bowl member during wide open throttle operating conditions. The second embodiment avoids these problems by locating the fin members adjacent to the individual baffles. This embodiment maintains the capability of a large air flow modulation while preserving aerodynamic conditions in the outlet plane.

A third embodiment of the invention is shown in FIGS. 6–13. The fuel injection means has central fuel feed body 210, a set of centripetal flow spin baffles 211 and annular cap 220 provided with internal annular channel 221 to tangentially distribute the fuel into the turbulent air flow passing through the spin baffles 211. Outer spin baffles 230 are located adjacent the interior of bowl member 240. In this embodiment, bowl member 240 is rotatably attached between the fuel injector and the combustion chamber and defines, with spin baffles 230, an air passage for the turbulent air flow. Spin baffles 230 may be formed integral with the bowl member 240 so as to rotate therewith, or may be mounted in a fixed position. The downstream, diverging portion of bowl 240 has radial flange 242 which, in its upstream side, defines at least one radial passage 243 between it and plate 271 of the upstream chamber portion 270. A cylindrical skirt member 244 extends from flange 242 toward the upstream direction and includes a thread for engagement with tightening nut 245. Ring 272 is attached to combustion chamber portion 270 and, together with skirt member 244, defines annular chamber 246. Skirt member 244 also defines a plurality of air openings 247 which communicate with chamber 246. Annular chamber 246 also communicates with the combustion chamber via radial passage 243 and by a plurality of long tubes 248 attached through the bowl member 240.

Cap member 260 is rigidly attached to the fuel feed tube at 261 and fits into skirt member 244. Cap 260 defines, in its downstream portion, a plurality of openings 262 which correspond to openings 247 of the skirt member. Upstream annular transverse plate 263 is attached to the cap member 260 adjacent the upstream end of the cylindrical bowl member portion 241. This plate defines openings 264 which provide communication between the upstream air flow and the passage 268. Fins 265 formed on plate 263 also serve to restrict the air flow through the baffles 230 when the bowl member 240 is rotated.

At its downstream portion, passage 268 communicates with annular chamber 246 via openings 262 and 247. Passage 268 also communicates with the combustion chamber via short tubes 249 mounted on the frustoconical portion of the bowl member 240. Perforated sheet metal plate 250 is located adjacent the frustoconical portion of the bowl member 240 and serves to distribute air over this portion to effect the cooling thereof. The sheet metal plate 250 and the wall of the bowl member 240 define a space which also communicates with radial passage 243.

This embodiment provides an air flow restriction means for both the internal and outer sets of spin baffles. A ring 290 is concentrically mounted about internal spin baffles 211 and defines openings 291 which correspond in size and number to the air passages of the spin baffles 211. Ring 290 is connected to the cylindrical portion 241 of the bowl member 240 by strips 292 which are dimensioned similar to fins 265 so as to provide a restriction of air flow through the spin baffles 230 when they are circumferentially displaced with respect to the fins 265. FIGS. 7–10 show details of the injector system when oriented in its wide open throttle mode, while FIGS. 11–13 show corresponding figures for low speed and stable speed operations.

An actuating mechanism (not shown) attached to nut 245 may rotate the assembly comprising skirt member 244, bowl member 240, fins 292 and ring 290 about the longitudinal axis of the combustion chamber. During wide open throttle operations, where maximum air flow must be transmitted, the rotatable assembly is positioned such that openings 262 coincide with openings 247, fins 292 are directly behind fins 265 (see FIG. 7) and the openings 291 coincide with the passages between the baffles of set 211 (FIG. 8). In this configuration, the assembly presents no obstacles to the air flow. The incoming air from the compressor which passes through the injection system is divided into three concentric flows: the first flow enters passage 268 through openings 264 and feeds annular chamber 246 through openings 247 and 262 causing cooling of the bowl by passing through perforated sheet metal plate 250 (FIG. 9) and feeds the combustion chamber through short tubes 249 (FIG. 10). Most of the air escapes from the annular chamber 246 through long tubes 248 and is injected into the combustion chamber. The remainder flows through passage 243 to assure cooling of the flange 242. Passage 243 also receives air having passed through sheet metal plate 250. Thus, any hot point formation on the flange is avoided to thereby preserve its mechanical strength. The second and third flows pass through the outer and internal sets of spin baffles where they are set into rotation and take part in atomizing the fuel as in the previous embodiments.

FIGS. 11, 12 and 13 show the low speed operation mode in which the openings 247 and 262 are moved out of alignment and annular chamber 246 no longer communicates with passage 268. The air cooling the flange is less and the air passing into the combustion chamber passes only through short tubes 249 (FIG. 13). The passageway through the outer set of spin baffles 230 is restricted by fins 292 which are offset from alignment with fins 265, as seen in FIG. 11. The air passage through the internal set of spin baffles 211 is also restricted by the position of ring 290 (FIG. 12).

The foregoing description is provided for illustrative purposes only and should not be construed as in any way limiting this invention, the scope of which is defined solely by the appended claims.

We claim:

1. A variable flow air-fuel mixing device for a turbo-jet engine having a combustion chamber, air supply means and fuel injection means, comprising:
   (a) a bowl shaped member interposed between the combusion chamber and the fuel injection means so as to define an air-fuel mixing zone, the bowl shaped member having a generally conical downstream portion;
   (b) a skirt member associated with the bowl shaped member so as to define a generally annular space therebetween, the skirt member defining a plurality of first air inlet openings in communication with the air supply means to allow air to pass into the annular space;
   (c) a plurality of air injection orifices defined by the conical downstream portion of the bowl shaped member in communication with the annular space to allow air to pass from the annular space into the air-fuel mixing zone, the air injection orifices oriented such that they extend obliquely with respect to a central axis of the bowl shaped member;
   (d) first means defining a first air passage into the air-fuel mixing zone;
   (e) first baffle means located in the first air passage to generate a turbulent air flow in the air-fuel mixing zone, the first baffle means comprising a plurality of baffles defining a plurality of air channels between them, each air channel having a substantially contant cross-section; and,
   (f) control means to simultaneously control the amount of air passing through the first baffle means and the air injection orifices, wherein the control means comprises:
      (i) a ring member rotatably mounted about the skirt member and the first air passage means;
      (ii) a plurality of first inlet orifices defined by the ring member;
      (iii) a plurality of second air inlet orifices defined by the ring member; and,
      (iv) means to rotate the ring member between an open position wherein the first air inlet orifices are aligned with the air channels between the baffles and the second air inlet orifices are aligned with the first air inlet openings of the skirt member, and a restricted position wherein the first air orifices are out of alignment with the air channels between the baffles and the second air orifices are out of alignment with the first air inlet openings of the skirt member so as to restrict the flow of air therethrough.

2. The variable flow air-fuel mixing device according to claim 1 wherein the first air passage directs air over the baffle means in a direction generally transverse to a longitudinal axis of the combustion chamber.

3. The variable flow air-fuel mixing device according to claim 1 and further comprising:
   second baffle means associated with the plurality of air openings and oriented substantially concentric with respect to the first baffle means.

4. The variable flow air-fuel mixing device according to claim 1 wherein the second means comprises a sleeve member concentrically mounted about the bowl shaped member, the sleeve member defining at least one air opening to allow air to enter the second air passage.

5. The variable flow air-fuel mixing device according to claim 1 further comprising a fin member attached to the ring member adjacent each of the plurality of first orifices and extending into the corresponding air channel.

6. The variable flow air-fuel mixing device according to claim 1 further comprising:
   (a) a cap member fixedly attached to the fuel injection means and extending around the bowl shaped member so as to define the second air passage therebetween; and,
   (b) rotatable mounting means to rotatably mount the bowl shaped member within the cap member.

7. The variable flow air-fuel mixing device according to claim 6 further comprising:
   (a) a first plurality of air openings defined by the cap member and communicating with the first air passage;
   (b) a ring member attached to the bowl shaped member; and,
   (c) a second plurality of air openings defined by the ring member such that, when the bowl shaped member is in an open position, the first and second plurality of air openings are aligned and, when the bowl shaped member is in a restricted position, the first and second plurality of air openings are out of alignment so as to restrict the flow of air therethrough.

8. The variable flow air-fuel mixing device according to claim 7 wherein the rotatable mounting means comprises:
   (a) a sleeve member rotatably attached to the combustion chamber;

(b) flange member extending from the bowl shaped member and attached to the sleeve member, the flange member defining at least one radial passage;
(c) an annular chamber defined between the sleeve member and the bowl shaped member communicating with the radial passage;
(d) a third plurality of air openings defined by the cap member; and,
(e) a fourth plurality of air openings defined by the sleeve member such that, when the bowl shaped member is in its open position, the third and fourth plurality of holes are in alignment to allow air to flow from the second air passage into the annular chamber, and when the bowl shaped member is in its restricted position, the third and fourth plurality of holes are out of alignment so as to restrict air flow therethrough.

* * * * *

UNITED STATES PATENT AND TRADEMARK OFFICE
CERTIFICATE OF CORRECTION

PATENT NO. : 4,726,182
DATED : February 23, 1988
INVENTOR(S) : BARBIER ET AL

It is certified that error appears in the above—identified patent and that said Letters Patent is hereby corrected as shown below:

In col. 1, line 34 delete "comprise" and insert --compromise--.

In col. 7, line 44, delete "combusion" and insert --combustion--.

In claim 3, col. 8, line 29, delete "air" and insert --first air inlet--.

Signed and Sealed this

Nineteenth Day of July, 1988

*Attest:*

DONALD J. QUIGG

*Attesting Officer*     *Commissioner of Patents and Trademarks*